J. B. COX.
Burial-Cases.
No. 143,438. Patented Oct. 7, 1873.
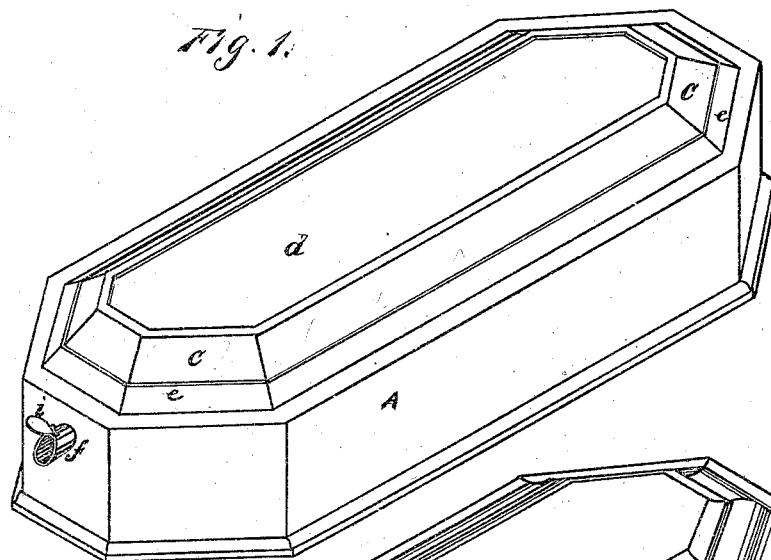
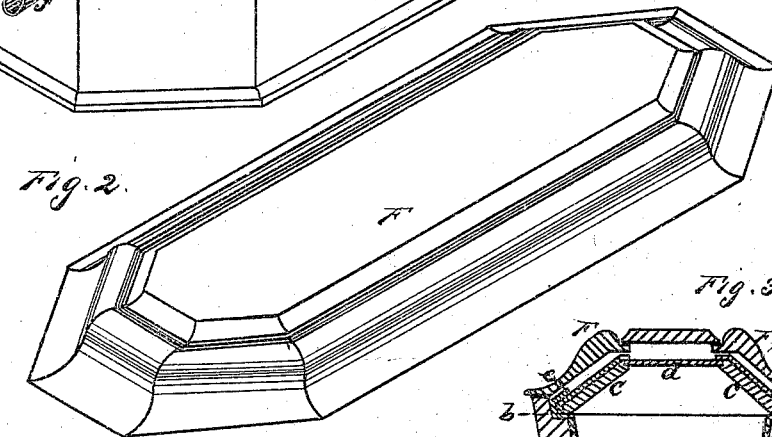
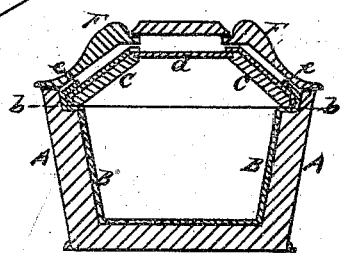
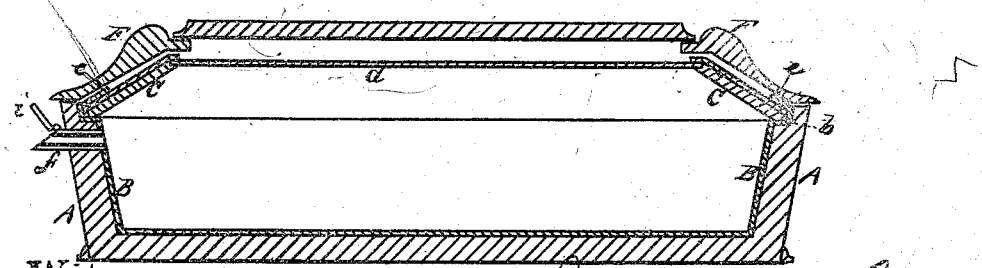
Witnesses
John L. Borne
C. M. Richardson
Jerome B. Cox
by Dewey & Co.
Att'ys

UNITED STATES PATENT OFFICE.

JEROME B. COX, OF SAN FRANCISCO, CALIFORNIA.

IMPROVEMENT IN BURIAL CASES.

Specification forming part of Letters Patent No. 143,438, dated October 7, 1873; application filed August 16, 1873.

*To all whom it may concern:*

Be it known that I, JEROME B. COX, of San Francisco city and county, State of California, have invented an Improved Burial Case; and I do hereby declare the following description and accompanying drawings are sufficient to enable any person skilled in the art or science to which it most nearly appertains to make and use my said invention or improvement without further invention or experiment.

My invention relates, first, to an improvement in securing the lead or other metal lining which is employed in air-tight burial cases, so that it will be supported by the roof or cover of the coffin, and thus be prevented from collapsing by reason of its own weight, as is the case where the lead lining is placed entirely inside of the coffin in the form of an inside box.

In order to more fully illustrate and explain my invention reference is had to the accompanying drawing forming a part of this specification, in which—

Figure 1 is a perspective view of the case. Fig. 2 is a perspective view of the cover. Fig. 3 is a transverse section of the case and cover. Fig. 4 is a longitudinal section in elevation.

A represents a burial case, having the lead or other metal lining B inside of it. As usually applied, this lining is made in the form of an inside box, which is soldered tight before securing the lid upon the coffin, thus leaving it entirely unsupported, so that it soon collapses by reason of its own weight.

With my arrangement I make a rabbet, *b*, entirely around inside of the upper edge of the coffin-box A, into which the edges of an inside or supplemental cover, C, will rest. This inside or supplemental cover is composed of a wooden frame, which forms the sloping sides and ends of the cover, and a glass top, *d*. The supplemental cover is smaller than the outside cover F, so that the outside cover can be screwed down upon the edges of the box A, and thus inclose the inside cover. The sides and ends of the lead or other metal lining B fit inside of the box A, and are crowded into the rabbet *b*, so that the edges of the supplementary cover C will rest upon the lead in the rabbet, and the portion *e*, which extends above the joint when the supplementary cover is in place, is folded down upon the outside or sloping sides and ends of the supplementary cover, and secured by solder to the metal covering of the frame, in the manner shown in the drawings, thus uniting the lining and supplementary cover into one box or lining, the whole being supported by the rabbet in the edge of the outside box or coffin.

By this arrangement I provide an air-tight lining that will not collapse, and at the same time I supply the glass window, so that the corpse can be viewed without disturbing any portion of the air-tight compartment.

I secure a tube in the box, at any desired point, so as to communicate at one end with the interior of the box, while the other end communicates with the air outside. This outer end is cut beveling, with the face of the bevel upward. The valve or clapper *i* is hinged to the upper side of the beveled edge, so that when it is closed it will lie upon the beveled end of the tube. The object of thus beveling the end of the tube is to keep the valve or clapper to its seat in case the coffin should be tipped out of a horizontal position.

Having thus described my invention, what I claim, and desire to secure by Letters Patent, is.

1. The coffin-box A, having the upper inner edges of its sides rabbeted, in combination with the lining B and supplementary or inside cover C, when said lining is made to pass under and over the edges of the supplementary cover, substantially as and for the purpose above described.

2. A burial case, consisting of the box A, lining *b*, supplementary or inside cover C, and outside cover F, when the parts are combined and united, substantially as above described.

In witness whereof I hereunto set my hand and seal.

JEROME B. COX. [L. S.]

Witnesses:
J. L. BOONE,
C. M. RICHARDSON.